United States Patent
Corradini et al.

[15] 3,668,156
[45] June 6, 1972

[54] COVULCANIZABLE MIXES COMPRISING DIENE POLYMERS OR COPOLYMERS AND LOW UNSATURATION TERPOLYMERS

[72] Inventors: Giorgio Corradini; Giuseppe Ghetti; Sebastiano Cesca; Arnaldo Roggero, all of San Donato Milanese, Italy

[73] Assignee: Snam Progettic S.p.A., Milan, Italy

[22] Filed: Apr. 23, 1970

[21] Appl. No.: 31,411

[30] Foreign Application Priority Data

Apr. 23, 1969 Italy...............................15874 A/69

[52] U.S. Cl................................260/5, 260/80.78, 260/889
[51] Int. Cl. .......................................................C08f 17/00
[58] Field of Search..............260/5, 888, 889, 80.78, 88.20

[56] References Cited

UNITED STATES PATENTS

| | | |
|---|---|---|
| 3,492,370 | 1/1970 | Wirth.....................................260/889 |
| 3,494,983 | 2/1970 | Diem.........................................260/5 |
| 3,527,739 | 9/1970 | Valvassori et al....................260/80.78 |
| 3,483,173 | 12/1969 | Natta et al. ..........................260/80.78 |
| 3,470,142 | 9/1969 | Sartori et al. ........................260/80.78 |
| 3,313,786 | 4/1967 | Kahle et al............................260/80.78 |
| 3,285,889 | 11/1966 | Arnold..................................260/80.78 |
| 3,464,959 | 9/1969 | Marconi et al.......................260/80.78 |
| 3,418,299 | 12/1968 | Benedikter et al..................260/80.78 |

*Primary Examiner*—John C. Bleutge
*Attorney*—Ralph M. Watson

[57] ABSTRACT

A terpolymer-diene composition that is readily curable with conventional vulcanizing agents is provided by preparing a mixture of diene polymer or copolymer with an olefinic terpolymer which includes at least one

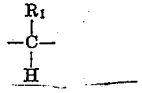

group directly bound to two carbon atoms, each of which is characterized by ethylenic unsaturation, wherein $R_1$ is a hydrocarbon radical.

4 Claims, No Drawings

COVULCANIZABLE MIXES COMPRISING DIENE POLYMERS OR COPOLYMERS AND LOW UNSATURATION TERPOLYMERS

The present invention refers to vulcanizable mixes comprising diene polymers or copolymers and low unsaturation terpolymers.

It is known that an important obstacle to introducing into the market terpolymers consisting of alpha-olefins and polyenes resides in the fact that said terpolymers cannot be cured when mixed with such conventional diene polymers as synthetic polyisoprene, natural rubber, polybutadiene, acrylonitrile-butadiene and butadiene-styrene copolymers in the presence of the conventional accelerating and curing agents.

The impossibility of producing mixes consisting of olefinic terpolymers and diene polymers or copolymers does not allow one to obtain articles presenting at the same time the good features of the olefinic terpolymers, for instance the high aging resistance and the low cost of the diene polymers and copolymers.

We have now found a new class of olefinic terpolymers which may form mixes which are covulcanizable with high unsaturation diene polymers and copolymers.

The terpolymers which can be covulcanized with the diene polymers and copolymers are the ones consisting of ethylene, propylene and a polyene having at least a $$-\overset{R_1}{\underset{}{C}}H-$$

group directly bound to two carbon atoms each one of them taking part in an ethylenic unsaturation, wherein $R_1$ is a hydrocarbon radical.

The polyenes which can be advantageously employed to form the terpolymers according to the present invention are the ones presenting besides a double bond which is engaged in the polymer formation, a residue of the following type:

$$-\overset{R_2}{\underset{}{C}}=\overset{R_3}{\underset{R_1}{C}}-\overset{H}{\underset{}{C}}-\overset{R_3}{\underset{}{C}}=\overset{R_4}{\underset{}{C}}-R_5$$

wherein $R_1$, $R_2$, $R_3$, $R_4$ and $R_5$ may be hydrogen or hydrocarbon radicals having one to five carbon atoms, furthermore the radicals $R_1$ to $R_5$ may form two by two one or more divalent radicals in order to introduce within the above residue one or more rings having four to seven carbon atoms. The above structure may also consist of a polyene ring when the two external carbon atoms are linked together.

Examples of terpolymers advantageously employed according to the invention are the ones claimed by the applicant in the copending application for patents n. 20868 A/68, which corresponds to U.S. application Ser. No. 855,771, filed Sept. 5, 1969 25239 A/68 which corresponds to U.S. application Ser. No. 886,390, filed Dec. 18, 1969 and 25242 A/68 now Italian Pat. No. 851,694 and other copending applications.

The mixture of olefinic terpolymers and diene polymers or copolymers may present a wide range of properties of the two components and the olefinic terpolymer may be comprised between 99 and 1 percent. The diene polymer or copolymer covulcanizable with the terpolymer may be selected among polybutadiene, natural or synthetic polyisoprene, polychloroprene, butadiene-styrene, butadiene-acrylonitrile and butadiene-isoprene copolymers and the like.

The vulcanization process is the conventional one.

The usual vulcanizing agents as well as the conventional vulcanization accelerators can be used.

The following not limitative examples illustrate the invention, however, they are not to be intended to restrict its scope.

EXAMPLE 1 a. A terpolymer consisting of ethylene, propylene, dehydrodicyclopentadiene was prepared according to the following procedure. In a 500 cm³ tubular reactor, provided with mechanical stirrer, thermometric sheath and a jacket for the thermostatic fluid 1,000 cm³ of n-hexane are introduced under inert gaseous atmosphere. In the same time a propylene-ethylene mixture having a molar ratio 2 to 1 was introduced in the bottom of the reactor at a flow of 1200 Nl/h; in order to improve the attainment of the saturation equilibrium the solvent was stirred during the gas introduction, while keeping its temperature at $-20°$ C. by circulating through the reactor jacekt a freezing mixture controlled with a cryostat. After 20 minutes of bubbling of the monomers mixture, the equilibrium conditions were presumably reached. Thereupon 2.4mmole/l of $(C_2H_5)_2AlCl$, 1.2mmoles/l of anisole and 1.5mmoles/l of dehydrodicyclopentadiene (or 5,2,1,0 7a, 3a-decatriene-3,5,7a) were introduced into the reactor, while the stream of gaseous monomers kept flowing the polymerization reaction was started by adding 0.4 mmoles/l of $VCl_4$.

The polymerization continued for 4 minutes; each minute 2mmoles/l of dehydrodicyclopentadiene were added.

The reaction was stopped by introducing 1 cm₃ of n-butanol into the reactor.

The reaction solution was washed with HCl acidulous water, then with $H_2O$ until neutralization, thereupon it was coagulated by slow addition of an excess of acetone, to which an aminic antioxiden A0 has been added.

After drying at a reduced pressure for 15 hours at 50° C., an elastomeric mass was obtained having the aspect of noncured rubber, in an amount of 18.3 g.

At the X-rays analysis said mass was completely amorphous revealing a $C_2H_4$ weight content of 61 percent while the intrinsic viscosity in toluene at 30° C. was 2.62 dl/g.

The dehydrodicyclopentadiene determination by iodometric titration gave 2.47 percent by weight.

b. The sample obtained in a was mixed on an open mill at room temperature with SBR 1,500 and conventional curing agents according to the following recipe: EPT 75, SBR 1,500 25, HAF 50, Circosol 4,240 5, Zinc oxide 5, stearic acid 1, mercaptobenzothiasole 0.5, tetramethyltriuran disulfide 1.5, sulfur 1.5.

The obtained mixture was vulcanized in a press at 145° C. for 40 minutes.

In Table 1 are reported the results of the tensile stress tests carried out on dumbell test pieces obtained from the obtained

TABLE I.—COVULCANIZATION OF EPT/SBR 75/25

| Tests | Termonomer (type) | Termonomer (mole/kg.) | $C_2H_4$ (percent by weight) | $[\eta]$ tol. 30° C. | M 100% (kg./cm.²) | M 200% (kg./cm.²) | C.R. (kg./cm.²) | A.R., percent | P. set, percent | Extraction with $CHCl_3$, percent |
|---|---|---|---|---|---|---|---|---|---|---|
| A |  | 0.190 | 61 | 2.62 | 46 | 102 | 170 | 300 | 10 | 7 |
| B | 1,5 hexadiene | 0.470 | 58 | 1.78 | 38 | | 36 | 195 | 15 | 31 |
| C | 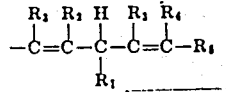 | 0.470 | 60 | 1.80 | 40 | 60 | 65 | 250 | 30 | 38 | plates, as well as the extraction percentage with $CHCl_3$ on the same plates.

In Table 1 the obtained data are reported, after treatment as described in paragraph b, on commercial terpolimer (EPAM) of the conventional type.

From the table it is possible to deduce that only in the case A the product properties are satisfactory (high modulus and maximum tensile stress, quite high elongation at break, low permanent set), therefore, it is only in this case that an even vulcanization took place. The extraction data confirm in an evident way that the polymer is insoluble only in the case A, thereby a vulcanization took place interesting both the terpolymer and the SBR rubber.

Throughout the present application M means the elongation modulus, C.R. means maximum tensile stress, A.R. means elongation at break and finally P. set means "permanent set."

EXAMPLE 2 a. A termonomer was synthesized comprising ethylene-propylene-dehydrodicyclopentadiene following the procedure described in Example 1, paragraph a.

| | |
|---|---|
| $VO(O-n-C_4H_9)_3$ | = 1.2 mmoles |
| $(C_2H_5)_2AlCl$ | = 12.0 mmoles |
| Toluene | = 1000 $cm^3$ |
| $C_3H_6/C_2H_4$ | = 2.0 (moles in the gaseous phase) |
| Dehydrodicyclopentadiene | = 30.0 mmoles (by proportioning the addition as described in Example 1) |
| Temperature | = 0°C. |
| Reaction time | = 10 minutes |

After coagulating the reaction solution and after drying the produced polymer, 22.1 g. of polymer were obtained being completely amorphous at the X-rays analysis and presenting the properties listed on Table II.

b. The sample of paragraph a of the present example was mixed on an open mill, at room temperature, with SBR 1,500, within the ratios EPT/SBR 75/25 and 25/75.

By employing SBR 1,500, the blends 75/25 and 25/75 and the sample of the paragraph a of the present invention four mixes were produced according to the following recipe: polymer 100, HAF 50, circosol 4240 5, Zinc ozide 5, stearic acid 1, mercaptobenzothiazole 0.5, tetramethyltriuramdisulfide 1.5, sulfur 1.5.

The reported technological data show the mixes SBR/EPT in the case D, are vulcanized.

The more important datum is the extraction percentage and the values obtained with the mixes as D compared with the ones of the sample A, confirm the polymer according to the invention are vulcanized.

TABLE II.—COVULCANIZATION SBR/EPT 75/25 AND 25/75

| | Termonomer (type) | Termonomer (mole/kg.) | $C_3H_6$ (percent by weight) | $[\eta]$ tol. 30° C. | SBR 100, EPT 0 | | | | | SBR 75, EPT 25 | | | | |
|---|---|---|---|---|---|---|---|---|---|---|---|---|---|---|
| | | | | | M 100, kg./cm.² | C.R., kg./cm.² | A.R., percent | P. set, percent | Extraction, percent | M 100, kg./cm.² | C.R., kg./cm.² | A.R., percent | P. set, percent | Extraction, percent |
| D | 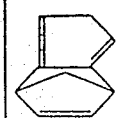 | 0.224 | 56 | 2.17 | 57 | 144 | 180 | 0 | 5.0 | 55 | 157 | 205 | 0 | 7.7 |
| E | 1,5 hexadiene | 0.47 | 58 | 1.80 | | | | | | 71 | 146 | 145 | 4 | 14 |

| | Termonomer (type) | Termonomer (mole/kg.) | $C_3H_6$ (percent by weight) | $[\eta]$ tol. 30° C. | SBR 25, EPT 75 | | | | | SBR 0, EPT 100 | | | | |
|---|---|---|---|---|---|---|---|---|---|---|---|---|---|---|
| | | | | | M 100, kg./cm.² | C.R., kg./cm.² | A.R., percent | P. set, percent | Extraction, percent | M 100, kg./cm.² | C.R., kg./cm.² | A.R., percent | P. set, percent | Extraction, percent |
| D | 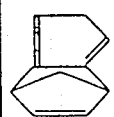 | 0.224 | 56 | 2.17 | 39 | 137 | 295 | 8 | 7.0 | 60 | 205 | 250 | 3 | 6.8 |
| E | 1,5 hexadiene | 0.47 | 58 | 1.80 | 39 | 38 | 170 | 12 | 30 | 62 | 205 | 220 | 2 | 3 |

EXAMPLE 3 a. A terpolymer was synthesized comprising ethylene-propylene and (2-norbor-5 enyl)-4' (or 5')-cyclopentadienyl-methane according to the procedure described in Example 1, paragraph a).

The following reagents are employed:

| | |
|---|---|
| toluene | = 1000 cm³ |
| VO(0-n-C₄H₉)₃ | = 0.8 mmole |
| (C₂H₅)₂AlCl | = 8 mmoles |
| 2-norbor-5- enyl-4'(or 5')-cyclopentadienyl-methane | = 5.5 mmoles |
| C₃H₆/C₂H₄ | = 2 (moles in gaseous phase) |
| temperature | = 0°C. |
| polymerization time | = 10 minutes |

After coagulating the reaction solution and drying the obtained polymer, 22.6 of elastomer are obtained completely amorphous at the X-rays analysis and presenting the characteristics listed on Table III.

b. The sample according to paragraph a of the present invention was mixed on open mill at room temperature, with SBR 1500, within the ratio range SBR/EPT 75/25 to 25/75.

By employing respectively SBR 1,500, the mix 75/25, the mix 25/75 and the sample of paragraph a) of the present example mixes were prepared according to the procedure disclosed in paragraph b of Example 2, then the mixes were vulcanized at 145° C. for 60 minutes. Tensile stress tests and extraction tests with ChCl₃ in soxhlet for 48 h. were carried out on the dumbell test pieces obtained from the vulcanized plates. The obtained data are reported in Table III.

TABLE III.—COVULCANIZATION SBR/EPT 75/25 AND 25/75

| Test | Termonomer (type) | Termonomer (mole/kg.) | C₂H₄ (percent by weight) | [η] tol. 30° C. | M 100, kg./cm.² | C.R., kg./cm.² | SBR 100, EPT 0 A.R., percent | P. set, percent | Extraction, percent | M 100, kg./cm.² | C.R., kg./cm.² | SBR 75, EPT 25 A.R., percent | P. set, percent | Extraction, percent |
|---|---|---|---|---|---|---|---|---|---|---|---|---|---|---|
| F | 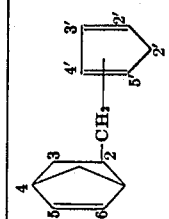 | 0.233 | 59 | 1.98 | 57 | 144 | 180 | 0 | 5 | 55 | 120 | 210 | 5 | 7 |

| Test | Termonomer (type) | Termonomer (mole/kg.) | C₂H₄ (percent by weight) | [η] tol. 30° C. | M 100, kg./cm.² | C.R., kg./cm.² | SBR 25, EPT 75 A.R., percent | P. set, percent | Extraction, percent | M 100%, kg./cm.² | C.R., kg./cm.² | SBR 0, EPT 100 A.R., percent | P. set, percent | Extraction, percent |
|---|---|---|---|---|---|---|---|---|---|---|---|---|---|---|
| F | 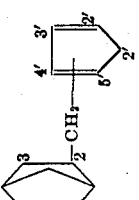 | 0.233 | 59 | 1.98 | 52 | 140 | 180 | 6 | 8 | 48 | 114 | 200 | 5 | 6 |

EXAMPLE 4 a. A terpolymer was prepared comprising ethylene-propylene-2(or 3)-allyldicyclopentadiene according to the usual procedure.

| | |
|---|---|
| n.eptane | = 1000 cm$^3$ |
| V(Acetylacetonate)$_3$ | = 0.7 mmole |
| (C$_2$H$_5$)$_2$AlCl | = 5.6 mmoles |
| C$_3$H$_6$/C$_2$H$_4$ | = 2.0 (moles in gaseous phase) |
| temperature | = 0°C. |
| reaction time | = 15 minutes |

After drying 16.4 g. of an elastomer completely amorphous at X-rays analysis were obtained and presented the characteristics shown in Table IV.

b. The sample according to paragraph a of the present example was mixed at room temperature with SBR 1,500 and conventional vulcanization agents, on open mill. The following recipe was employed: EPT 75, SBR 1,500 25, HAF 50, circosol 4,240 5, Zn oxide 5, stearic acid 1, mercaptobenzothiasole 0.5, tetramethylthiuramdisulfide 1.5, sulfur 1.5.

The mix was vulcanized at 145° C. for 40 minutes. In Table IV the data of the tensile stress tests carried out on double test piece obtained from the moulded plates are reported, as well as the extraction percentage with CHCl$_3$ (48 h. in Soxhlet) of the same plates.

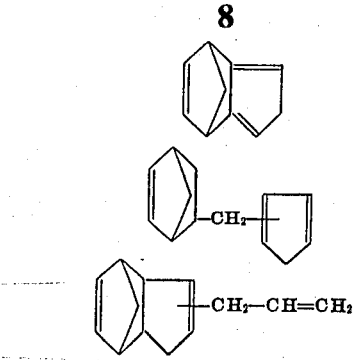 and 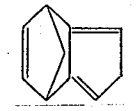

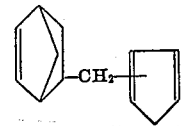

2. A vulcanizable mix as claimed in claim 1 wherein said termonomer is represented by the following formula:

3. A vulcanizable mix as claimed in claim 1 wherein said termonomer is represented by the following formula:

TABLE IV.—COVULCANIZATION OF EPT AND SBR 75/25

| Test | Termonomer (type) | Termonomer (mole/kg.) | C$_2$H$_4$ (Percent by weight) | [η] tol. 30° C. | M 100%, kg./cm.$^2$ | M 200%, kg./cm.$^2$ | C.R., kg./cm.$^2$ | A.R., percent | P. set, percent | Extraction, percent |
|---|---|---|---|---|---|---|---|---|---|---|
| 6 | 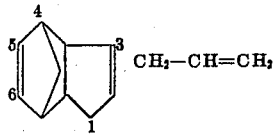 | 0.500 | 63 | 1.56 | 40 | 110 | 195 | 240 | 10 | 5 |

What is claimed is:

1. A vulcanizable mix containing ethylene-propylene olefinic terpolymers and diene polymers and copolymers having high unsaturation characterized in that said terpolymers have, in their carbon atoms chain, groups derived from a termonomer represented by one of the following formulae:

4. A vulcanizable mix as claimed in claim 1 wherein said termonomer is represented by the following formula:

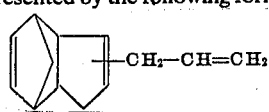

* * * * *

UNITED STATES PATENT OFFICE
CERTIFICATE OF CORRECTION

Patent No. 3,668,156  Dated June 6, 1972

Inventor(s) Giorgio Corradini, Giuseppe Ghetti, et al

It is certified that error appears in the above-identified patent and that said Letters Patent are hereby corrected as shown below:

line 37, "1 cm$_3$" should read -- 1 cm$^3$ --.

Column 3, line 4, "(EPAM)" should read -- (EPDM) --.

Column 5, line 28, change "ChCl$_3$" to read -- CHCl$_3$ --.

Column 4, Table II, in the sub-heading (last occurrence) after "M 100" insert -- % --.

Signed and sealed this 19th day of March 1974.

(SEAL)
Attest:

EDWARD M. FLETCHER, JR.
Attesting Officer

C. MARSHALL DANN
Commissioner of Patents